April 21, 1931.  J. REIG ET AL  1,802,271
ELECTRIC HEATER ATTACHMENT FOR WINDSHIELDS
Filed June 9, 1930
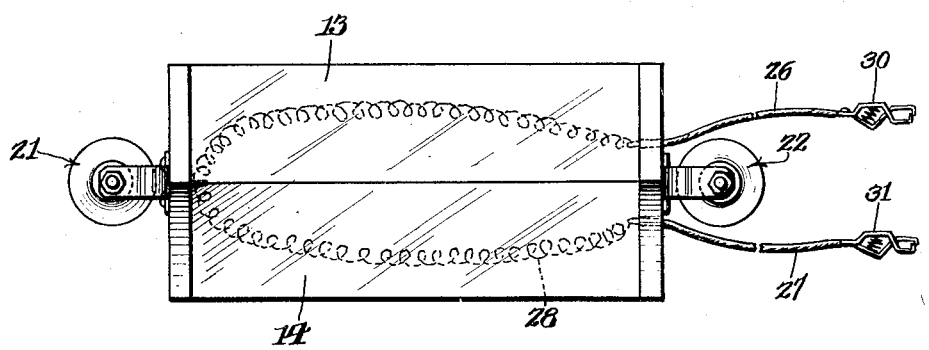
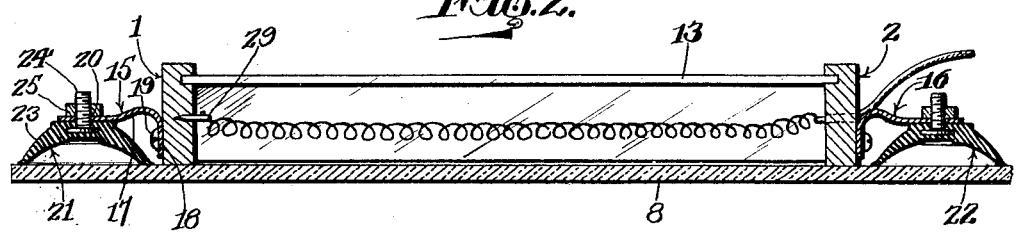
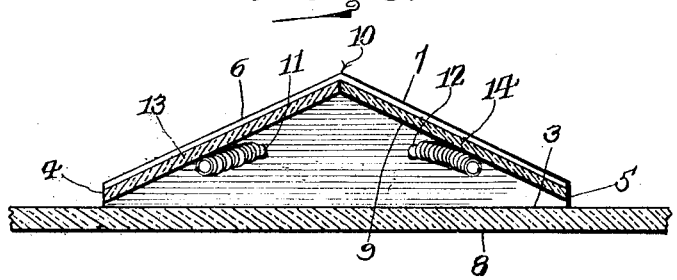
INVENTOR.
John Reig
BY A. Cruz
Geo. P. Kimmel
ATTORNEY.

Patented Apr. 21, 1931

1,802,271

UNITED STATES PATENT OFFICE

JOHN REIG AND ANTONIO CRUZ, OF WALLINGFORD, CONNECTICUT

ELECTRIC HEATER ATTACHMENT FOR WINDSHIELDS

Application filed June 9, 1930. Serial No. 459,952.

This invention relates to an electric heater attachment designed primarily for use in connection with windshields of automotive vehicles, but it is to be understood that an attachment, in accordance with this invention, may be employed in any connection for which it is found applicable, and the invention has for its object to provide, in a manner as hereinafter set forth, a heating attachment of the class referred to capable of being readily installed with respect to the windshield to provide for clear vision for the driver of the vehicle through the windshield in case of inclement weather.

A further object of the invention is to provide, in a manner as hereinafter set forth, an attachment of the class referred to, to prevent the adhering of snow, sleet and ice upon that portion of the windshield used by the driver of the vehicle for vision thereby materially reducing to a minimum accidents which would be caused due to impaired vision through the windshield.

Further objects of the invention are to provide, in a manner as hereinafter set forth, an electric heater attachment for windshields which is simple in its construction and arrangement, strong, durable, compact, readily installed with respect to a windshield without marring the latter, thoroughly efficient in its use, and comparatively inexpensive to manufacture.

With the foregoing and other objects in view the invention consists of the novel construction, combination and arrangement of parts as hereinafter more specifically described, and illustrated in the accompanying drawing, wherein is shown an embodiment of the invention, but it is to be understood that changes, variations and modifications can be resorted to which fall within the scope of the claims hereunto appended.

In the drawing wherein like reference characters denote corresponding parts throughout the several views:—

Figure 1 is a front elevation of an electric heater attachment in accordance with this invention.

Figure 2 is a longitudinal sectional view thereof as applied to a windshield.

Figure 3 is a transverse sectional view of the attachment.

Referring to the drawing, the attachment includes a pair of spaced, parallel, substantially triangular shaped end members 1, 2 of like construction and preferably formed of wood of the desired thickness. Each end member includes an elongated flat inner edge 3, a pair of side edges 4, 5 and a forward edge inclining in opposite directions inwardly from the center thereof to the side edges 4, 5. The oppositely inclined portion of the front edge of each end member is indicated at 6, 7. The side edges 4, 5 are of materially less length than either of the portions of the front edge and also of materially less length than the inner edge 3. When the attachment is employed the edges 4, 5 are disposed at right angles with respect to the windshield 8 and the edge 3 abuts against the windshield 8. When the attachment is used the end members 1, 2 are vertically disposed. The inner face of each end member is formed from the edge 4 to edge 5 with a groove 9 which is arranged in close proximity to the forward edge 10 of the end member. The groove 9 conforms in contour to said forward or front edge 10 of the end member. The groove 9 in the end member 1 aligns with the groove 9 formed in the end member 2. Between the transverse median of the end member 2 and its side edge 4 an opening 11 is provided and between the transverse median of the end member 2 and its side edge 5 an opening 12 is formed.

Interposed between the end members 1, 2 and seated in the grooves 9 is a pair of oppositely disposed, transparent panels 13, 14 which abut at their upper or inner side edges and have their lower or outer side edges flush with the edges 4, 5 of the members 1, 2. The panels 13, 14 are arranged outwardly with respect to the openings 11, 12. The panels 13, 14 are spaced from the edge 3 of members 1, 2.

Secured to the outer face of each end member 1, 2 and projecting laterally therefrom and disposed centrally with respect thereto is a holder device for a retainer member. The holder devices are indicated generally at 15.

16 and as they are of like construction, but one will be described as the description of one will apply to the other. Each holder device comprises a substantially angle-shaped arm formed of a leg 17 and a leg 18. The leg 18 is positioned against the outer face of an end member, centrally thereof and fixedly secured therewith by holdfast means 19. The arm 17 projects laterally from the end member and is formed with an opening 20 in proximity to its outer end.

The retaining members or devices are of like construction and are referred to generally at 21, 22. Each retaining member consists of a body portion 23 in the form of a suction cup provided with a peripherally threaded stem 24 which extends through the opening 20. Carried by the stem 24 is a clamping nut 25 which is adapted to abut against the arm 17 to secure the body portion 23 therewith. The body portion 23 abuts against one face of arm 17 and the clamping nut 25 against the other face thereof.

Extending through the openings 11, 12 are circuit connections 26, 27 and to which an electric heater element 28 is coupled. The heater element 28 is arranged between the end members 1, 2 when spaced from the panels 13, 14. The heater element is in the form of a split loop and is anchored by the coupling means 29 to the end member 1. The circuit connections 26, 27 are provided with spring clips 30, 31 respectively for connecting them with a source of electrical energy.

The attachment is adapted to be secured against the outer face of the windshield 8, at the desired point by the retaining members 21, 22 and as said members or devices are of the suction type the attachment may be secured in position, that is to say, detachably secured in position, without marring the windshield. The holder devices 15, 16 are resilient permitting of the compressing and expanding of the body portions 23 of the retaining members when occasion requires.

As the transparent panels are disposed at opposite inclinations with respect to each other moisture will readily be discharged therefrom and as the snow, frost or sleet is melted very quickly due the action of the heating element 28, the vision of the driver or operator of the vehicle will not be impaired. The attachment will be positioned against that portion of the windshield employed by the driver or operator of the car for vision.

It is thought that the many advantages of an electrical heater attachment in accordance with this invention and for the purpose set forth can be readily understood, and although the preferred embodiment of the invention is as illustrated and described, yet it is to be understood that changes in the details of construction can be had which fall within the scope of the invention as claimed.

What we claim is:
1. A heater attachment for windshields comprising a pair of spaced, parallel end members, one of said members formed with a pair of spaced openings, a pair of oppositely disposed, rearwardly inclined, abutting transparent members arranged between and secured in said end members, an electric heating element positioned between said end members and rearwardly of said transparent members, means for anchoring said element with the non-apertured end member, circuit connections extending through said openings and terminating in said element, resilient holder devices extending from said end members, and retaining means carried by said devices for detachably connecting the attachment upon the windshield.

2. In an electric heater attachment for windshields, the combination of a pair of end members, each having its inner face grooved, the groove of one member aligning with the groove in the other member, one of said members formed with a pair of spaced openings, a pair of abutting, oppositely disposed, rearwardly inclining transparent panels having their ends seated in said grooves, a split, loop shaped electric heating element positioned between said members inwardly of said panels, circuit connections extending through said openings and terminating in the split ends of said element, means for anchoring said element at its closed end to the other of said end members, and means carried by said end members for detachably connecting the attachment upon the windshield.

3. In an electric heater attachment for windshields, the combination of a pair of end members, each having its inner face grooved, the groove of one member aligning with the groove in the other member, one of said members formed with a pair of spaced openings, a pair of abutting, oppositely disposed, rearwardly inclining transparent panels having their ends seated in said grooves, a split, loop shaped electric heating element positioned between said members inwardly of said panels, circuit connections extending through said openings and terminating in the split ends of said element, means for anchoring said element at its closed end to the other of said end members, oppositely disposed holder devices anchored to and extending from said end members, and retaining members for detachably securing said attachment upon the windshield, said retaining members including means for clamping them to said holder devices.

In testimony whereof, we affix our signatures hereto.

JOHN REIG.
ANTONIO CRUZ.